United States Patent [19]

Mottur et al.

[11] Patent Number: 4,517,204
[45] Date of Patent: May 14, 1985

[54] REDUCED CALORIE PUFFED SNACK FOOD PRODUCTS

[75] Inventors: George P. Mottur, Danville, Pa.; Richard W. Glass, College Station, Tex.

[73] Assignee: Frito-Lay, Inc., Dallas, Tex.

[21] Appl. No.: 583,971

[22] Filed: Feb. 27, 1984

[51] Int. Cl.$^3$ .................... A23L 1/18; A21D 13/08
[52] U.S. Cl. .................... 426/94; 426/302; 426/448; 426/804; 426/808
[58] Field of Search ............... 426/94, 96, 289, 302, 426/445, 448, 449, 804, 808

[56] References Cited

U.S. PATENT DOCUMENTS

| | | | |
|---|---|---|---|
| 3,023,104 | 2/1962 | Battista | 99/1 |
| 3,157,518 | 11/1964 | Battista | 99/166 |
| 4,143,163 | 3/1979 | Hutchison et al. | 426/96 |
| 4,394,397 | 7/1983 | Lometillo et al. | 426/448 |
| 4,451,490 | 5/1984 | Silverman et al. | 426/804 |

Primary Examiner—George Yeung
Attorney, Agent, or Firm—Bernard, Rothwell & Brown

[57] ABSTRACT

In a process for manufacturing reduced calorie puffed snack products, edible meal or flour is mixed with hydrophilic polysaccharide coated microcrystalline cellulose and sufficient moisture to form a puff extrudable batter. The batter is cooked in a cooking extruder under puff extrusion cooking conditions and extruded to form collets. The collets may then be baked to reduce the moisture content of the collets to below about 2% by weight, sprayed with oil and dusted with flavoring. Microcrystalline cellulose coated with a hydrophilic polysaccharide does not inhibit the expansion (puffing) characteristics of the batter upon extrusion.

23 Claims, No Drawings

REDUCED CALORIE PUFFED SNACK FOOD PRODUCTS

BACKGROUND OF THE INVENTION

1. Field of the Invention

The present invention relates to a process for manufacturing reduced calorie puffed snack food products, and to products produced by the process.

2. Description of the Background Art

Puffed snack food products are popular consumer items for which there exists a great demand. For example, sales of cheese puffs or curls in the United States alone amounted to approximately 320 million dollars in 1982 for all brands. There is also a tremendous consumer interest in weight control and therefore in products that provide normal eating satisfaction with significantly fewer calories.

Reduced calorie or "diet" soft drinks can be produced relatively easily by merely making substitutions for the sugar sweetener. However, in snack food products it has heretofore been thought to be impossible to achieve any significant, i.e., one-third or more, reduction in calories.

Puffed snack products are made from a batter containing meal or flour and other ingredients. The batter is cooked in a cooking extruder to a temperature and pressure at which the mixture will "puff" or expand upon reaching atmospheric pressure after extrusion. The extrusion is then cut to form collets and fried or baked to reduce the moisture content of the collets to less than about 2% by weight. The collets are usually flavored after baking or frying by being coated with a slurry containing oil and flavoring (e.g., cheese and salt) to produce the final product. One such flavored puffed snack product that is well known to consumers is "CHEETOS" brand sold by Frito-Lay, Inc., the assignee of this invention.

The calories present in puffed snack products are derived primarily from the meal or flour and oil or fat content of the snacks. It is very difficult to reduce the caloric content of fried puffed snacks because of the natural tendency for the product to absorb oil during the frying process. While baked puffed snacks are generally lower in oil content than fried puffed snacks, the caloric content of the meal or flour in the snack generally limits any further reduction in calories.

Commercially successful reduced calorie breads have been produced by replacing a portion of the grain flour therein with plain cellulose as a bulking agent. Humans cannot digest cellulose, which passes through the digestive tract without releasing any calories. Heretofore, the use of cellulose as a bulking agent in puffed snack products has not been commercially successful since plain cellulose inhibits the expansion characteristic (puffing) of the collets, and results in a final product with a coarse texture.

There is a need in the art for a process for manufacturing a reduced (by one-third or more) calorie puffed snack product with taste and texture characteristics similar to conventionally produced puffed snack products.

SUMMARY OF THE INVENTION

In accordance with the present invention, a process for producing a comestible reduced calorie puffed snack product comprises introducing into a cooking extruder a mixture of a puff extrudable edible meal or flour, microcrystalline cellulose coated with from about 9% to about 15% by weight hydrophilic polysaccharide, and sufficient moisture to form an extrudable batter; cooking said mixture in said cooking extruder under snack puff cooking conditions to a sufficient temperature and pressure at which the mixture will puff upon extrusion; extruding the mixture from the cooking extruder to form collets; and drying the collets to reduce their moisture content to less than about 2% by weight.

DETAILED DESCRIPTION OF THE INVENTION

The present invention provides a process for the manufacture of reduced calorie puffed snack products. It has surprisingly been discovered that microcrystalline cellulose, when coated with a hydrophilic polysaccharide and mixed with a puff extrudable meal or flour and water, does not inhibit the expansion characteristics (puffing) of the mixture after extrusion from a cooking extruder.

Microcrystalline cellulose (MCC) is produced by exposing cellulose (usually from wood pulp) to partial acid hydrolysis sufficient to liberate the microcrystals of which cellulose fibers are composed. A hydrophilic polysaccharide, such as carboxymethyl cellulose, alginate gums, and the like, is added to the microcrystalline cellulose to provide the relatively hydrophobic surface of the cellulose with a hydrophilic coat.

Microcrystalline cellulose particles which contain from about 9% to about 15% by weight hydrophilic polysaccharide as a coating are suitable for use according to the present invention. It is preferred that the microcrystalline cellulose be coated with carboxymethyl cellulose (CMC). When CMC coated MCC is used according to the present invention, it is preferred that the CMC coating comprise at least about 9% by weight of the particles with about 15% by weight CMC being particularly preferred.

Acording to the present invention, MCC coated with a hydrophilic polysaccharide (sometimes referred to as coated MCC) is mixed with a puff extrudable edible meal or flour and sufficient moisture to form a puff extrudable batter. Puff extrudable edible meals or flours suitable for use according to the present invention include those made from corn, rice, oats, wheat, potatoes, legumes, and the like, or mixtures thereof. Corn meal is particularly preferred for use according to the present invention.

The ratio of meal or flour to coated MCC in the batter is preferably from about 9:1 to about 3:1 by weight, with a ratio of about 4:1 being particularly preferred.

In one embodiment of the present invention, a small amount of edible oil or fat is added to the batter (e.g., from about 0.5% to about 4% by weight). This results in an improvement of collet texture and increases the expansion of the batter upon extrusion. This is in contrast to the expansion inhibiting effect of oil in batter made without coated MCC. Emulsifiers, such as lecithin, and mono- and di-glycerides, may optionally be added to the oil to improve expansion of the collets. When emulsifiers are used, they are preferably at a concentration from about 0.1% to about 1.0% by weight, with a concentration of about 0.5% by weight being most preferred.

The batter is cooked in a cooking extruder under temperatures and pressures which result in the expansion (puffing) of the batter upon reaching atmospheric pressure when extruded. Puff extrusion cooking conditions are well known in the art, and generally include temperatures at or above the boiling point of water and pressures of from about 2,000 to about 4,000 lbs. per square inch at the outlet of the extruder. The batter generally has a moisture content of from about 10% to about 25% by weight. The extrusion is usually cut into collets and then baked or fried. The shape of the collet depends upon the die employed at the extruder outlet and the cut-off system. Common shapes include rods or balls, but collets of other shapes may be produced.

According to the present invention, it is preferable that the batter have a moisture content of about 17–18% and that the extrusion system impart a large quantity of work per pound of product to enhance the expansion characteristic of the extrusion. Work input can be increased by a combination of increased auger RPM, residence time and shear, and decreased feed rate, compared to conventional methods.

In particularly preferred embodiments, the collets are baked after extrusion. Baking is preferred over frying because of the oil which frying necessarily adds to the collets during the frying process. The collets are baked until their moisture content is reduced to below about 2% by weight. The collets are preferably baked at a temperature within the range of from about 270° F. to about 340° F., most preferably about 300° F. The baking time, usually from about 3 to about 12 minutes, is dependent upon the temperature. At a temperature of about 300° F., a baking time of about 5 minutes is preferred.

The collets may then be coated with flavoring materials, e.g., cheese, barbeque flavoring, salt, and the like. A mixture of cheese and salt is the preferred flavoring material.

When cheese and salt is employed as the flavoring material for conventional puffs, the cheese and salt is typically mixed with oil to form a slurry and the collets are coated with the slurry. When cheese and salt is employed as a flavoring according to the present invention, it is preferred that an edible oil or fat be first sprayed onto the surface of the collets to achieve total oil content of the collets of about 7% by weight or less. The collets are then dusted with a mixture of cheese and salt. This spraying and dusting method has been found to impart the collets with improved cheese flavor over conventional slurry methods, while at the same time reducing the oil content of the final product. Vegetable oils having a melting point below about 95° F. are preferred for use during the oil spraying step, with 90° F. melt seasoning oil (containing, for example, cottonseed oil, soy bean oil, and the like), being most preferred.

Puffed snack products produced according to the present invention are lower in calories than conventional puffed snack products. The use of hydrophilic polysaccharide coated MCC in the batter reduces the caloric content of the collets without inhibiting the expansion characteristics of the batter. The MCC adds dietary fiber to the product, which is also desirable to consumers. Addition to the batter of small amounts of oil, which may optionally contain emulsifiers, increases the expansion of the batter upon extrusion, as does imparting a relatively large quantity of work to the batter per pound of product. Baking the collets, instead of frying, adds no additional calories, and spraying the collets with a small amount of oil, followed by dusting the collets with flavoring materials, imparts greater flavor to the product with fewer calories than coating the collets with an oil based slurry.

Baked cheese flavored corn curls produced according to the present invention have at least one-third fewer calories and lower density than conventionally produced baked cheese curls. The lower density results in 50% greater volume per unit bag size of the standard product. Therefore, due to the low density the product of this invention will contain less than one-half the calories of an equal volume of standard product. The reduced calorie product also contains about 16% dietary fiber, recognized as an important ingredient in a well balanced diet. The product of this invention also has three-fourths less oil than the standard commercial product.

Consumer testing has shown that overall acceptability of the reduced calorie cheese flavored corn curls is at least equal to standard full calorie product ("CHEETOS"), even under conditions where respondents were unaware of any special dietary claim for the product.

The invention is further illustrated by the following examples, which are not intended to be limiting.

EXAMPLE I

Two parts water and 80 parts yellow corn meal (by weight) are pre-mixed in a ribbon blender for ten minutes. CMC coated MCC (Avicel ® CL611) is added to achieve a ratio of corn meal to CMC coated MCC of 4:1 (by weight), and mixed another five minutes.

The mixture is introduced into Baker-Perkins ® twin screw extruder Model MPF-50D with a feed rate of 150 pounds per hour, an auger speed of 350 RPM, and jacket temperatures of 85° F., 120° F., 150° F., 150° F. and 200° F. for the five zones going from feed to die end. The auger configuration is as follows: ¼" paddle spacer, 6" feed screw, 8 forwarding paddles at 60°, 4" feed screw, a 90° paddle, 11" single lead screw, 3 forwarding paddles at 60°, 3 reversing paddles at 30°, and a one inch spacer.

Additional water is added to the batter after it has entered the extruder to bring the total moisture content to 18% by weight. The cooked batter is extruded and cut into collets. The collets are baked in a forced air oven at 300° F. for 5 minutes. The baked collets are sprayed with 90° F. melt seasoning oil to bring the total oil content of the collets to 7% by weight, and the collets are dusted with powdered Kraft ® Shar-pee ™ cheese and salt. Reduced calorie cheese curls with ⅓ fewer calories than conventional cheese curls are produced.

EXAMPLE II

A batter is mixed as described in Example I, except that vegetable oil (2% of final feed weight) is mixed into the corn meal before any water is added.

The feed mix is processed through a Wenger ® X-20 single screw extruder fitted with a triple flighted, slotted nose cone, rear steam lock 364-1, and front (die end) steam lock 324.1. The front barrel is heated to 230° F. and rear barrel to 170° F. The auger rotates at 400 RPM and feed rate is 210 pounds per hour.

The cooked batter is extruded and cut into collets. The collets are baked in a forced air oven at 300° F. for 5 minutes. The baked collets are sprayed with 90° F. melt seasoning oil to bring the total oil content of the collets to 7% by weight, and the collets are dusted with powdered Land O'Lakes ® L-16 mellow cheese and salt. Reduced calorie cheese curls with ⅓ fewer calories than conventional cheese curls are produced.

What is claimed is:

1. A process for producing a comestible reduced calorie puffed snack product comprising:
    (a) introducing into a cooking extruder a mixture of a puff extrudable edible meal or flour, microcrystalline cellulose coated with from about 9% to about 15% by weight hydrophilic polysaccharide, and sufficient moisture to form a puff extrudable batter, wherein the ratio of edible meal or flour to hydrophilic polysaccharide coated microcrystalline cellulose is from about 9:1 to about 3:1 by weight;
    (b) cooking said mixture in said cooking extruder under puff extrusion cooking conditions;
    (c) extruding said mixture from said cooking extruder to form puffed collets; and
    (d) drying said collets to reduce the moisture content of said collets to less than about 2% by weight.

2. The process of claim 1 wherein the moisture content of said collets is reduced to below about 2% by weight by baking said collets.

3. The process of claim 2 wherein additionally said baked snack puff product is coated with flavoring material after baking.

4. The process of claim 2 wherein said baked snack puff product is coated with edible oil or fat after baking, and then dusted with flavoring material.

5. The process of claim 4 wherein said edible oil or fat is sprayed onto said baked snack puff product to achieve a total oil content of said baked snack puff product of about 7% by weight.

6. The process of claim 5 wherein said oil or fat has a melting point below about 95° F.

7. The process of claim 6 wherein said oil is vegetable oil.

8. The process of claim 7 wherein said extrudable edible meal is corn meal.

9. The process of claim 8 wherein the ratio of said corn meal to said hydrophilic polysaccharide coated microcrystalline cellulose is about 4:1 by weight.

10. The process of claim 9 wherein said extruded mixture is baked at from about 270° F. to about 340° F.

11. The process of claim 10 wherein said extruded mixture is baked for from about 3 to about 12 minutes.

12. The process of claim 11 wherein said flavoring material is a mixture of cheese and salt.

13. The process of claim 12 wherein the moisture content of said batter is from about 17% to about 18% prior to extrusion.

14. The process of claim 13 wherein additionally from about 0.5% to about 4% by weight of an edible oil or fat is mixed with said corn meal prior to mixing with said hydrophilic polysaccharide coated microcrystalline cellulose.

15. The process of claim 14 wherein said edible oil or fat added to said mixture of corn meal and hydrophilic polysaccharide coated microcrystalline cellulose contains about 0.5% by weight emulsifier.

16. The process of claim 15 wherein said hydrophilic polysaccharide is carboxymethyl cellulose.

17. The process of claim 16 wherein said microcrystalline cellulose contains from about 9% to about 15% carboxymethyl cellulose by weight as a coating.

18. The process of claim 17 wherein said extruded mixture is cut into rod or ball shaped collets prior to baking.

19. The process of claim 18 wherein said collets are baked at about 300° F. for about 5 minutes.

20. A reduced calorie baked cheese flavored puff product produced according to the process of claim 12.

21. A reduced calorie baked cheese flavored puff product produced according to the process of claim 14.

22. A reduced calorie baked cheese flavored puff product produced according to the process of claim 15.

23. A reduced calorie baked cheese flavored puff product produced according to the process of claim 19.

* * * * *